United States Patent
Mitchell et al.

(10) Patent No.: US 9,892,549 B2
(45) Date of Patent: Feb. 13, 2018

(54) ADAPTIVE RENDERING WITH LINEAR PREDICTIONS

(71) Applicant: Disney Enterprises, Inc., Burbank, CA (US)

(72) Inventors: Kenneth Mitchell, Earlston (GB); Bochang Moon, Edinburgh (GB); Jose A. Iglesias-Guitian, Edinburgh (GB)

(73) Assignee: Pixar, Emeryville, CA (US)

( * ) Notice: Subject to any disclaimer, the term of this patent is extended or adjusted under 35 U.S.C. 154(b) by 50 days.

(21) Appl. No.: 15/183,493

(22) Filed: Jun. 15, 2016

(65) Prior Publication Data

US 2017/0365089 A1 Dec. 21, 2017

(51) Int. Cl.
*G06T 15/50* (2011.01)
*G06T 15/06* (2011.01)
*G06T 13/20* (2011.01)

(52) U.S. Cl.
CPC ............ *G06T 15/506* (2013.01); *G06T 15/06* (2013.01); *G06T 13/20* (2013.01)

(58) Field of Classification Search
CPC ........ G06T 15/506; G06T 15/06; G06T 13/20
See application file for complete search history.

(56) References Cited

U.S. PATENT DOCUMENTS

| | | | | |
|---|---|---|---|---|
| 2002/0010571 A1* | 1/2002 | Daniel, Jr. | ......... | G05B 23/0216 703/21 |
| 2008/0056586 A1* | 3/2008 | Cheng | .................. | H04N 19/527 382/232 |
| 2012/0098832 A1* | 4/2012 | Chartouni | ............... | G06T 17/00 345/426 |
| 2016/0098820 A1* | 4/2016 | Rousselle | ............... | G06T 5/002 345/426 |
| 2017/0263046 A1* | 9/2017 | Patney | .................... | G06T 15/20 |

* cited by examiner

*Primary Examiner* — Maurice L McDowell, Jr.
(74) *Attorney, Agent, or Firm* — Patterson + Sheridan, LLP

(57) ABSTRACT

Systems, methods and articles of manufacture for rendering an image. Embodiments include selecting a plurality of positions within the image and constructing a respective linear prediction model for each selected position. A respective prediction window is determined for each constructed linear prediction model. Additionally, embodiments render the image using the linear prediction models using the constructed linear prediction models, where at least one of the constructed linear prediction models is used to predict values for two or more of a plurality of pixels of the image, and where a value for at least one of the plurality of pixels is determined based on two or more of the constructed linear prediction models.

20 Claims, 6 Drawing Sheets

ADAPTIVE RENDERING WITH LINEAR PREDICTIONS

BACKGROUND

Field of the Invention

Embodiments disclosed herein relate to computer-generated imagery (CGI) and computer-aided animation, and more specifically, this disclosure relates to techniques for efficiently rendering images using a select number of linear prediction models of varying prediction sizes.

Description of the Related Art

With the increasingly wide-spread availability of computers, many graphic artists and animators rely upon computers to assist in the production process for the creation of animations, computer-generated imagery (CGI) and the like. In doing so, the artists and animators may create virtual models stored in computer memory that represent physical models or other entities (e.g., fictitious characters). Typically, two-dimensional (2D) or three-dimensional (3D) computer-aided animation combines 2D/3D models of objects and programmed movement of one or more of the models. In 3D computer animation, an object modeling process can be used in which objects are sculpted, akin to working with real day or plaster, working from general forms to specific details, for example, with various sculpting tools. Models may be constructed, for example, out of geometrical vertices, faces, and edges in a 3D coordinate system to represent the objects. These virtual models can be manipulated using computers to, for example, simulate physics, design aesthetic actions such as poses or other deformations, create lighting, coloring and paint, or the like, of characters or other elements of a computer animation display.

Generally speaking, if the physical properties and external forces acting on a simulated object are accurately modeled, the resulting motion of the simulated object will be plausible and seemingly realistic. For instance, in rendering a virtual character wearing a jacket, the cloth of the jacket should hang down and fold naturally (i.e., as the physical cloth of a physical jacket would hang and fold). Furthermore, the cloth should react according to the motions and positions of the virtual character when the virtual character wears the jacket. In a similar fashion, the behavior and mannerisms of the virtual character should mirror the behavior and mannerisms of a real person, in order for the rendered scene to appear realistic. However, modeling simulated objects to be truly accurate is a delicate balance between the limitations and complexities of the animator's knowledge of physics and particle systems on the one hand and budgetary and time constraints on the other.

SUMMARY

Embodiments provide a system, method and computer program product for rendering an image. The system, method and computer program product include selecting a plurality of positions within the image and constructing a respective linear prediction model for each selected position. A respective prediction window is determined for each constructed linear prediction model. Additionally, the system, method and computer program product render the image using the linear prediction models using the constructed linear prediction models, where at least one of the constructed linear prediction models is used to predict values for two or more of a plurality of pixels of the image, and where a value for at least one of the plurality of pixels is determined based on two or more of the constructed linear prediction models.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
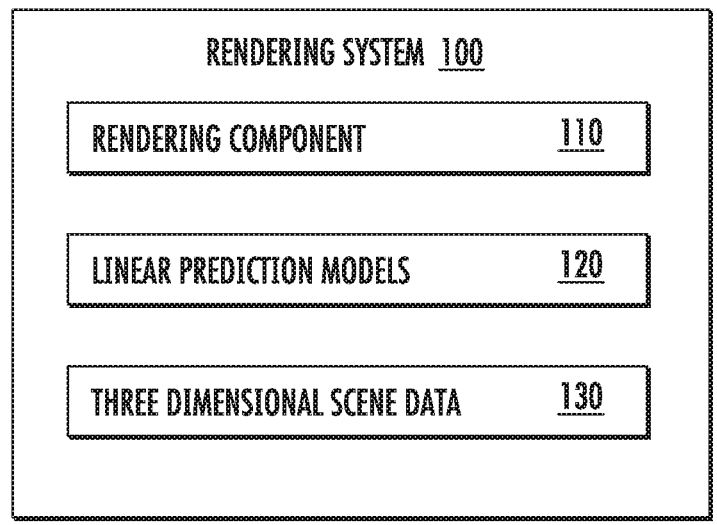
FIG. 1 is a block diagram illustrating a system configured with a rendering component, according to one embodiment described herein.

Numerous computing platforms and tools have been specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec). One core functional aspect of PRMan can include the use of a "rendering engine" to convert geometric and mathematical descriptions of objects into images. This process is known in the industry as "rendering." For movies, other animated features, shorts, and special effects, a user (e.g, a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation. Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

Monte Carlo (MC) ray tracing has received extensive attention for synthesizing realistic rendering results. However, MC ray tracing generally requires a huge amount of ray samples (e.g., more than ten thousand samples per pixel) until a converged or even visually pleasing image is generated. Moreover, the slow convergence of MC ray tracing directly leads to exhaustive rendering time (e.g., hours), which is often proportional to the number of ray samples generated. Thus, when a relatively small number of ray samples (e.g., less than one hundred) per pixel are allocated, images are typically corrupted by MC noise, i.e., variances.

Generally, adaptive rendering techniques can adjust sampling density non-uniformly and apply smoothing locally, in order to significant boosts MC ray tracing by drastically reducing the required number of ray samples. These methods can generally be classified into two categories in terms of the dimensionality of MC samples: multi-dimensional rendering and image space adaptive rendering. For instance, multi-dimensional rendering methods can generally allocate samples and reconstruct them in a high dimensional space, where each coordinate corresponds to a random parameter in the MC integration. These methods can produce a high quality image even with a small number of samples (e.g., 8), but managing individual samples may require high computational and memory overhead. On the other hand, image space methods utilize per-pixel information (e.g., 56 colors, variances, and G-buffer) that can be easily obtained in rendering, and thus these techniques can be easily applied into existing rendering frameworks.

Such techniques have been shown to improve the performance of MC ray tracing by an order of magnitude. Their main target applications, however, are often limited to off-line rendering frameworks, since the computational overhead is relatively large due to their expensive reconstruction (e.g., non-local means and local regression). Especially, local linear approximation techniques can show a superior reconstruction performance compared to other rendering techniques when a reference image has a strong linear correlation with given features (e.g., textures), but with such performance comes a very expensive reconstruction time, since such techniques it utilize a complex optimization process (e.g., least-squares fitting).

As such, embodiments described herein provide an improved adaptive rendering technique, which performs model reconstruction and optimization for only a portion of pixels and then predicts filtered values for the remaining pixels by using estimated linear models. Doing so estimates optimal colors in a region (i.e., multiple pixels) by performing a novel linear prediction based reconstruction, thereby improving performance over conventional techniques which apply noise filtering techniques for every pixel within the rendered image.

More specifically, embodiments presented herein provide improved noise filtering techniques in which linear prediction models are created for only a portion of pixels within the image, and the remaining pixels within the image are predicted using the linear prediction models. Generally, each a linear prediction model specifies a function for predicting color values within the image. Additionally, each linear prediction model defines a region of the image for which pixel values will be predicted using the linear prediction model (e.g., by itself, in conjunction with other linear prediction models, etc.). For instance, each linear prediction model can specify a central pixel and a prediction window which defines the size of the region around the central pixel that will be predicted using the linear prediction model.

In one embodiment, a rendering software component estimates coefficients of local linear models recursively given different sizes of a prediction window, and uses such linear models to predict multiple pixels for a rendered image. Additionally, the rendering software component can perform a recursive error analysis to estimate the prediction error introduced by the linear prediction. The rendering software component could then select an optimal prediction size by using the error analysis. The rendering software component can also provide an adaptive sampling approach which allocates additional ray samples on high error regions, by using our estimated prediction errors. Doing so provides an optimized rendering process capable of producing a high quality image with improved performance over conventional rendering techniques.

FIG. 1 is a block diagram illustrating a system configured with a rendering component, according to one embodiment described herein. As shown, the system 100 includes rendering component 110, linear prediction models 120 and three-dimensional scene data 130. Generally, the rendering component 110 is configured to render an image of a three-dimensional scene represented by the three-dimensional scene data 130. In doing so, the rendering component 110 could select a number of positions within the image to be rendered. For example, the rendering component 110 could select only a portion of pixels within the image to be rendered. The rendering component 110 could then construct a respective linear prediction model 120 for each selected position. Generally, each linear prediction model 120 can be used to reconstruct a number of pixels within a predefined region (or window) within the image.

As discussed above, each a linear prediction model 120 specifies a function for predicting color values within the image. The rendering component 110 can generally construct a linear prediction model 120 based on attributes of the three-dimensional scene data 130. In one embodiment, the linear prediction models 120 are defined using the first-order Taylor polynomial, shown by Equation 1, from a center pixel c.

Linear Prediction Model $$f(x_i) \approx f(x_c) + \nabla f(x_c)^T (x_i - x_c) \qquad \text{Equation 1}$$

In Equation 1, $X_i$ denotes a feature vector at pixel i. For instance, such a feature vector can be constructed by rendering-specific features (e.g., geometries) represented within the three-dimensional scene data 130. The ground truth value) $f(x_c)$ and its gradient $\nabla f(x_c)$ are unknown, but can be estimated in the least squares sense, which minimizes the sum of squared residuals between filtered values reconstructed by least squares and input values y. Once the estimated gradient is computed, the rendering component 110 can predict the ground truth function at the pixels within the prediction window.

In constructing the linear prediction models 120, the rendering component 110 could perform a linear prediction model estimation operation in which the coefficients and prediction window of each linear prediction models 120 are optimized. As an example, the rendering component 110 could construct the plurality of linear prediction models 120, each having a different prediction interval, and the rendering component 110 could then select the optimal prediction interval having the lowest amount of estimated error. However, constructing multiple linear prediction models 120 can be a computationally expensive task. As such, in one embodiment, the rendering component 110 is configured to use an iterative estimation process for efficiently computing linear models as a function of the prediction interval.

In one embodiment, the rendering component 110 is configured to determine an optimal prediction window for the linear prediction models 120 based on an estimation of prediction error for rendering a portion of the image, as a function of a prediction window of the linear prediction model 120. In one embodiment, the rendering component 110 is configured to estimate the prediction error using a recursive function that estimates a measure of newly added error as the size of the prediction window of the linear prediction model 120 increases.

Additionally, the rendering component 110 can determine a region(s) within the image being rendered that have an unacceptably high level of predicted error, and can allocate additional ray samples to these regions. For example, the rendering component 110 could determine that a particular region has a predicted error above a predefined threshold amount of error, and can allocate additional ray samples to the particular region sufficient to reduce the predicted rate of error below the predefined threshold amount of error. The rendering component 110 could then render the image using the linear prediction models 120 and the additional ray samples. Doing so provides a more efficient and improved rendering technique.

In one embodiment, the rendering component 110 is configured to initially select a sparse number of predefined positions within the image being rendered and to construct linear prediction models 120 for each of the predefined positions. In doing so, the rendering component 110 can calculate an optimal prediction window for each of the constructed linear prediction models 120. The rendering component 110 could then determine at least one pixel within the image that is not encompassed by any of the constructed linear prediction models 120, based on the respective prediction window for each of the constructed linear prediction models. Generally, a pixel can be said to be encompassed by a linear prediction model 120 when the pixel is within the region of the image defined by the center pixel and the prediction window of the linear prediction model 120.

The rendering component 110, upon determining that the at least one pixel is not encompassed by any of the constructed linear prediction models 120, the rendering component 110 could select an additional position within the image. The rendering component 110 could then construct an additional linear prediction model 120 corresponding to the additional position within the image, such that the additional linear prediction model 120 is used to predict a value for the at least one pixel when rendering the image. In one embodiment, the rendering component 110 can repeat the process of determining a pixel(s) not encompassed by any linear prediction models, selecting an additional position and constructing an additional linear prediction model until all pixels within the image are encompassed by at least one linear prediction model. Doing so ensures that values for all the pixels within the image can be predicted using at least one linear prediction model.

Figure 2A:
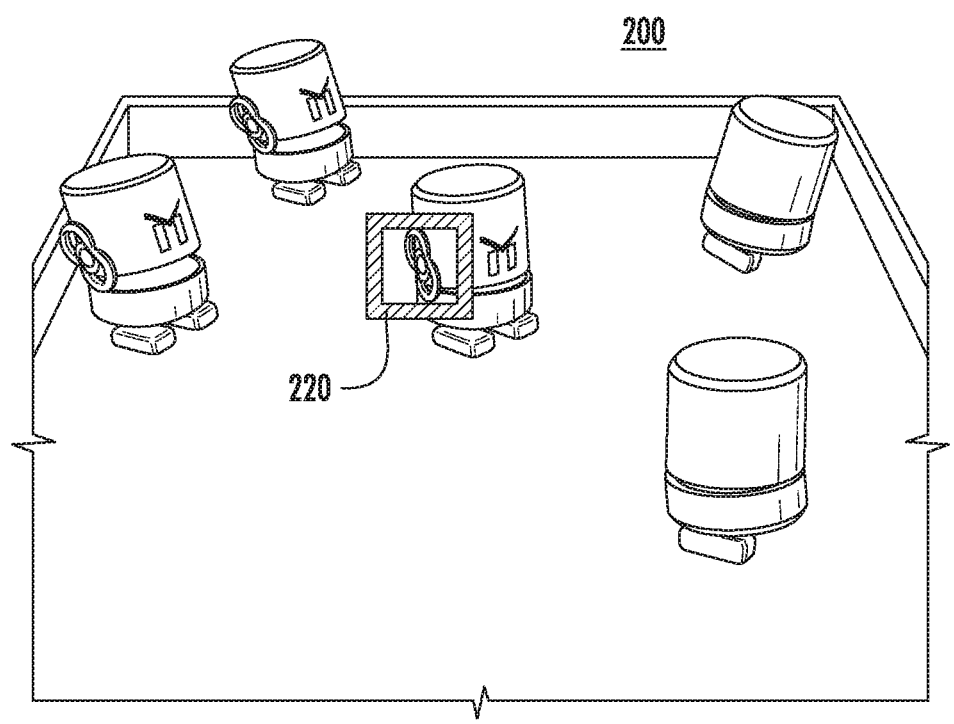
FIGS. 2A-B illustrate rendered images, according to embodiments described herein.
Figure 2B:
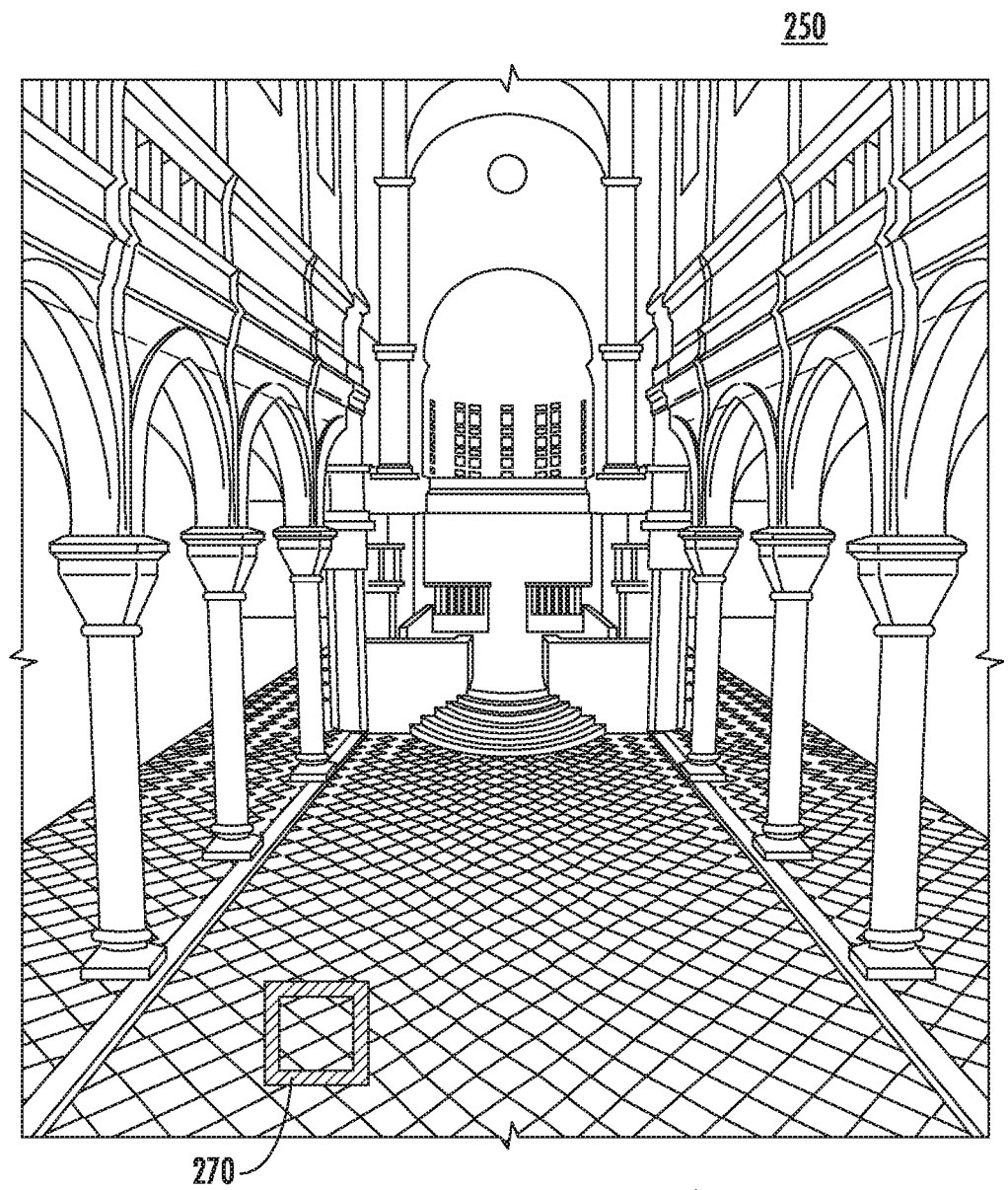

An example will now be discussed with relation to FIGS. 2A-B, 3A-B and 4A-B. FIGS. 2A-B illustrate rendered images, according to embodiments described herein. As shown, FIG. 2A depicts an image 200 and a highlighted region 220 within the image 200. Likewise, FIG. 2B depicts an image 250 and a highlighted region 270 within the image 250. Correspondingly, FIG. 3A illustrates a magnified view of the highlighted region 220 within the image 200, and FIG. 3B illustrates a magnified view of the highlighted region 270.

Generally, as discussed above, the rendering component 110 can select a plurality of positions within an image to be rendered. For instance, in one embodiment, the rendering component 110 can select a number of predefined positions throughout the image (e.g., a sparse number of positions evenly distributed throughout the image). The rendering component 110 can then construct a respective linear prediction model 120 for each of the plurality of positions. In doing so, the rendering component 110 can calculate an optimal prediction window for each of the linear prediction models 120.

Once the rendering component 110 has constructed the linear prediction models 120, the rendering component 110 can determine whether each pixel within the image (e.g., image 200, image 250, etc.) is encompassed by at least one of the linear prediction models 120. Upon determining that at least one pixel is not encompassed by any of the linear prediction models 120, the rendering component 110 can select an additional position(s) within the image and can construct an additional linear prediction model(s) 120 centered at the selected additional position. The rendering component 110 could then repeat the steps of determining whether each pixel within the image is encompassed by at least one of the linear prediction models 120 (including the additional linear prediction model(s)), selecting an additional position(s) within the image and constructing an additional linear prediction model(s) 120, until the rendering component 110 determines that all pixels within the image to be rendered are encompassed by at least one of the constructed linear prediction models 120. Doing so enables the rendering component 110 to construct linear prediction models 120 with an optimal prediction window, while ensuring that color values for all pixels within the image can be predict using at least one of the prediction models.

Figure 3A:
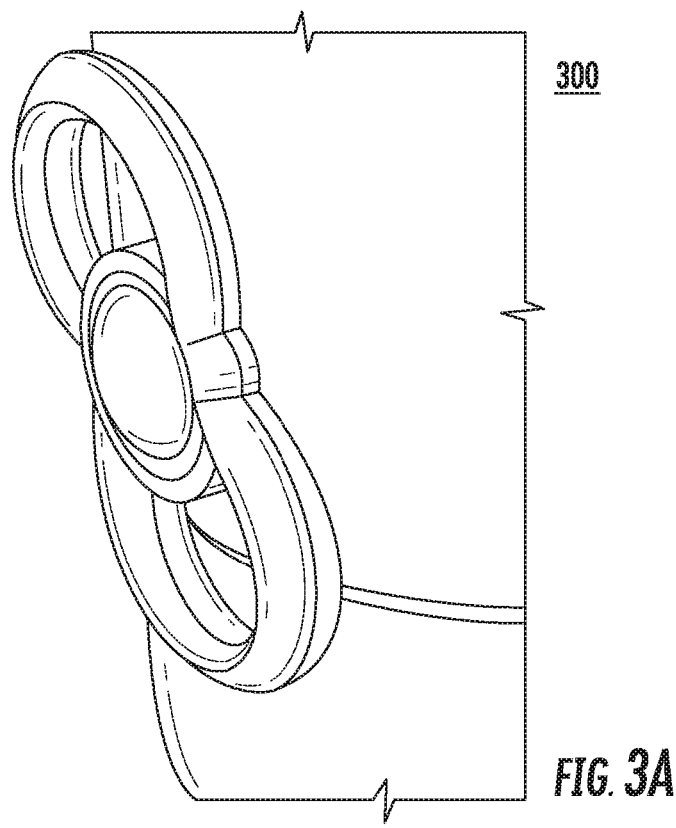
FIGS. 3A-B illustrate magnified views of the highlighted regions within the images depicted in FIGS. 2A-B, according to embodiments described herein.
Figure 3B:
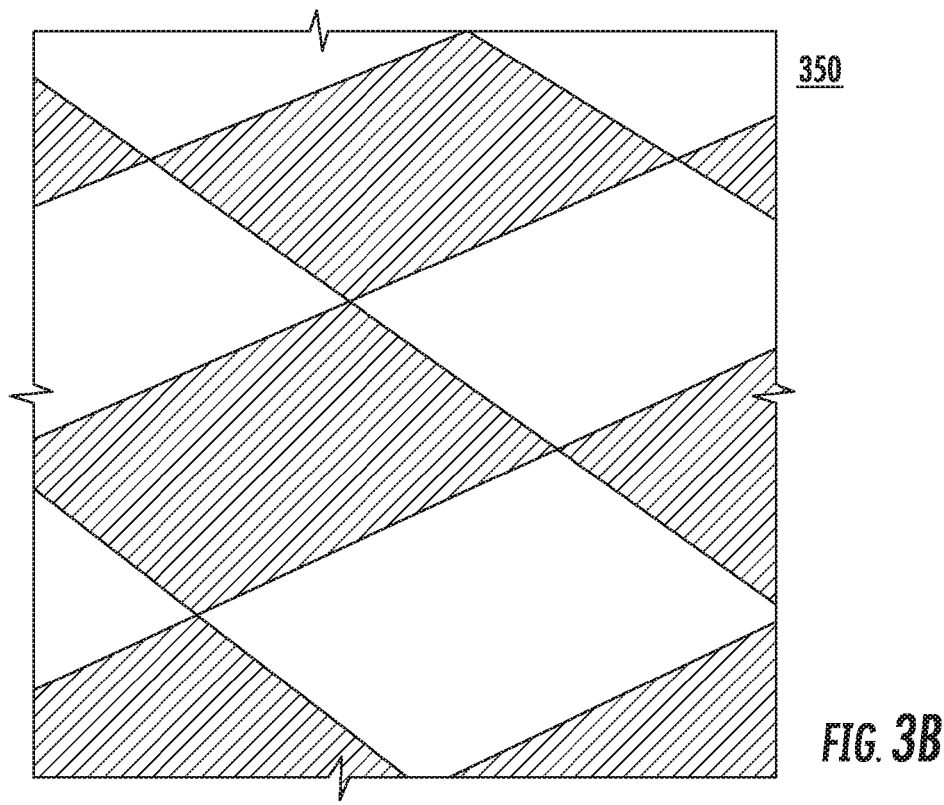
Figure 4A:
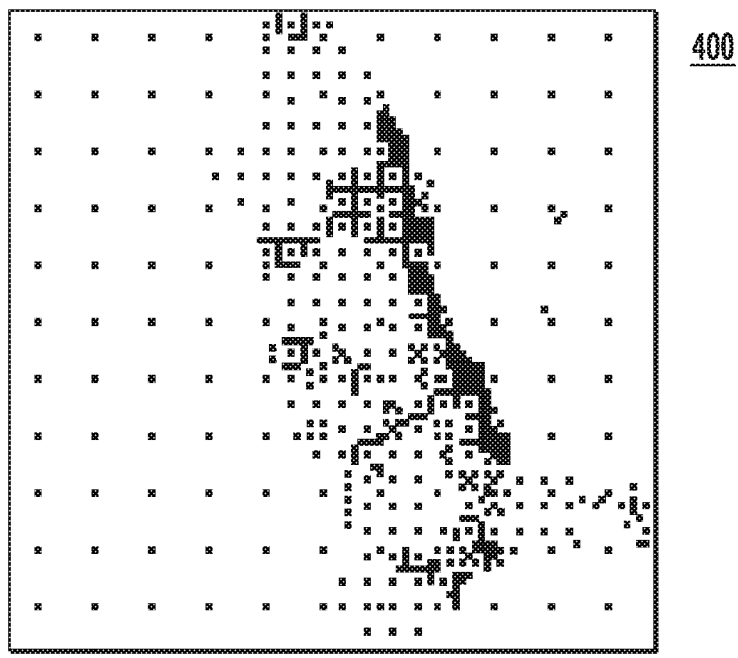
FIGS. 4A-B illustrate center pixels for a plurality of linear prediction models constructed for the magnified views of the highlighted regions shown in FIGS. 3A-B, according to embodiments described herein.
Figure 4B:
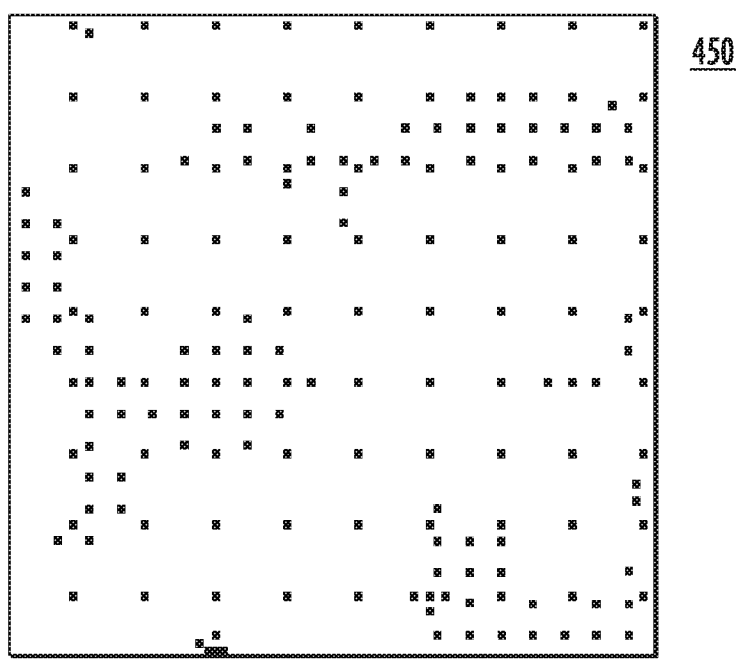

FIGS. 4A-B illustrate center pixels for a plurality of linear prediction models constructed for the magnified views of the highlighted regions shown in FIGS. 3A-B, according to embodiments described herein. As shown, FIG. 4A is an illustration 400 depicting an allocation of the center pixels of constructed linear prediction models, for the magnified view 300 shown in FIG. 3A. Similarly, FIG. 4B is an illustration 450 depicting an allocation of the center pixels of constructed linear prediction models, for the magnified view 350 shown in FIG. 3B. As can be seen, the rendering component 110 has adaptively distributed the center pixels for the linear prediction models throughout the highlighted regions, in order to minimize the predicted error in the rendered image. That is, an even distribution of linear prediction models with fixed prediction windows throughout the image may result in noisy or over-smoothed resulting image. As such, the rendering component 110 can be configured to adaptively distribute linear prediction models of optimal sizes, thereby producing a higher quality reconstruction of the three-dimensional scene.

Figure 5:
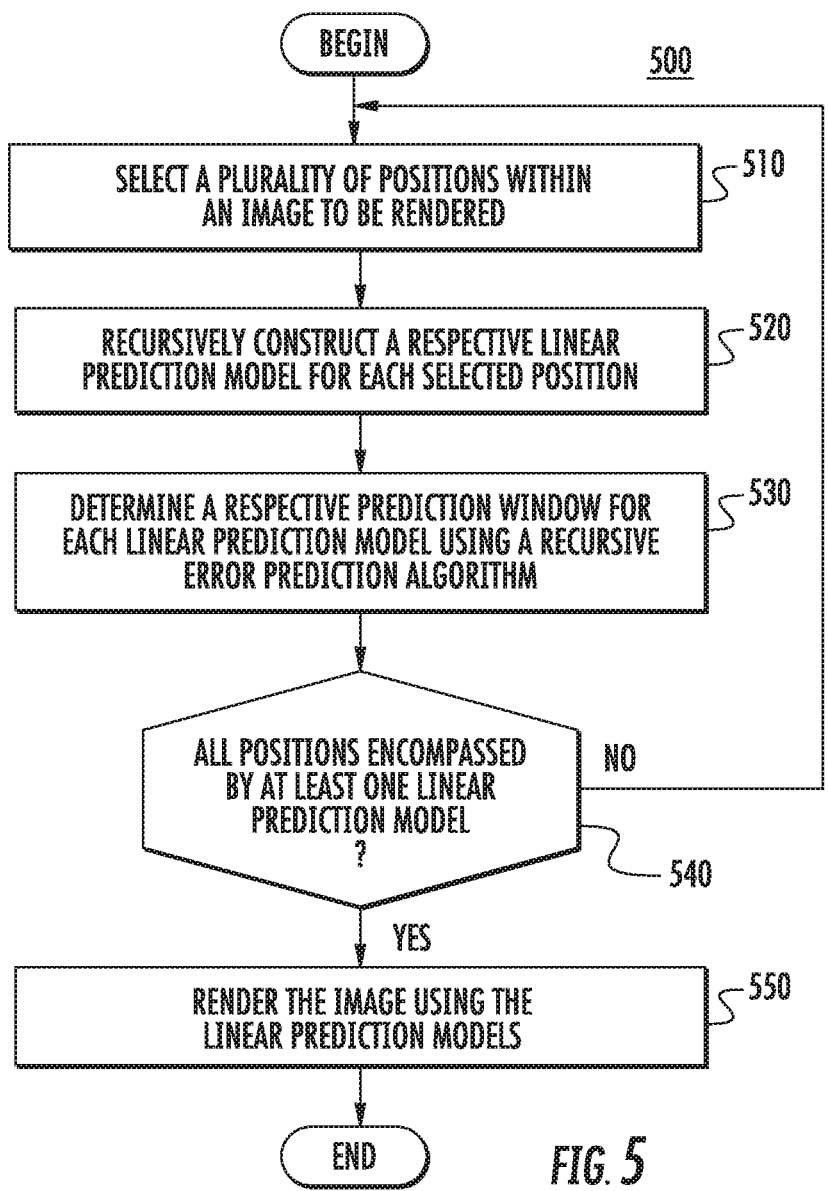
FIG. 5 is a flow diagram illustrating a method for rendering an image using a plurality of adaptively allocated linear prediction models, according to one embodiment described herein.

FIG. 5 is a flow diagram illustrating a method for rendering an image using a plurality of adaptively allocated linear prediction models, according to one embodiment described herein. As shown, the method 500 begins at block 510, where the rendering component 110 selects a plurality of positions within an image to be rendered. For example, the rendering component 110 could be configured to initially select a sparse number of evenly distributed positions throughout the image to be rendered.

The rendering component 110 then recursively constructs a respective linear prediction model for each selected position (block 520). For example, the rendering component 110 could construct each linear prediction model by estimating the coefficients (i.e., intercept and gradient) of a linear function (e.g., the first-order Taylor polynomial), which correspond to the ground truth value $f(x_c)$ and its gradient $\nabla f(x_c)$ in Equation 1, for a given prediction size (i.e., an interval of the first-order Taylor polynomial). Generally, the rendering component 110 is configured to estimate the optimal linear model defined as a linear model computed within the optimal prediction size $k_{opt}$, which has a minimal prediction error $\xi_c(k_{opt})$. Generally, the optimization to calculate the prediction size $k_{opt}$ can be formulated as shown in Equation 2.

Prediction Size Optimization                    Equation 2

$$k_{opt} = \operatorname{argmin}_k \xi_c(k) = \operatorname{argmin}_k \frac{1}{k} \sum_{i \in \Omega_c(k)} \left( \hat{f}(x_i) - f(x_i) \right)^2$$

That is, the rendering component 110 can be configured to minimize the average squared difference between the predicted values and the ground truth values over the pixels defined in the prediction window, as all pixels within the prediction window may be calculated using the linear prediction model.

As shown, the method 500 continues where the rendering component 110 determines a respective prediction window for each linear prediction model, using a recursive error prediction algorithm (block 530). In one embodiment, the rendering component 110 is configured to estimate the prediction error for rendering a portion of the image with a given linear prediction model, as a function of a prediction window of the linear prediction model. While certain least squares-based methods require a matrix inversion for each prediction size k, such a computational cost is prohibitive for solving the normal equation for each candidate linear prediction model that is considered. As such, in a particular embodiment, the rendering component 110 is configured to update the inverse covariance matrix $P_c(k)$ and the corresponding linear model $\hat{\beta}_c(k)$ by using both $X_k$ and $Y_k$ at the k-th pixel from ones computed by prior k−1 pixels, as shown in Equation 3.

Optimal Coefficients for Linear Models                    Equation 3

$$G_c(k) = \frac{P_c(k-1)z_k}{1 + z_k^T P_c(k-1)z_k},$$

$$P_c(k) = P_c(k-1) - G_c(k) z_k^T P_c(k-1),$$

$$\hat{\beta}_c(k) = \hat{\beta}_c(k-1) + G_c(k)\left(y_k - \hat{\beta}^T(k-1)z_k\right)$$

More specifically, in such an equation, $z_k^T = (1, (x_k - x_c)^T)$ corresponds to the k-th row in the design matrix of the normal equation, and the vector $G_c(k)$ can be considered as a weight allocated to a new sample pair $X_k$ and $Y_k$, while the linear model $\hat{\beta}_c(k)$ is updated by considering a weighted priori error $(y_k - \hat{\beta}^T(k-1)z_k)$. Analogously, the inverse covariance matrix $G_c(k)$ is updated using such a weight. As such, the computed linear model $\hat{\beta}_c(k)$ up to k pixels is the least squares solution which minimizes the least squares cost function $\Sigma_{i \in \Omega_c(k)} (\hat{f}(x_i) - y_i)^2$. By constructing the linear prediction models with optimal coefficients, the rendering component 110 can produce a higher quality resulting image.

The rendering component 110 could then determine an optimal prediction window for the linear prediction model, based on the estimated prediction error. As discussed above, given the recursive reconstruction of the linear prediction models, the rendering component 110 has iteratively computed multiple linear prediction models $\hat{\beta}_c(k)$ as the prediction size grows to k. In order to select an optimal prediction size, the rendering component 110 can estimate the prediction error $\xi_c(k)$ introduced when predicting k pixels by the linear prediction model $\hat{\beta}_c(k)$. In doing so, the rendering component 110 can be configured to utilize the recursive least squares computations used in constructing the linear prediction models, through which the rendering component 110 can predict subsequent samples from previous samples. For example, given a linear model $\hat{\beta}_c^T(k-t)$ computed with k−t pixels, the rendering component 110 can estimate the prediction error in the next t steps as $(\hat{\beta}_c^T(k-t)z_i - y_i)^2$ with newly added t samples before updating the linear model with those t samples.

More specifically, the t pixels can be considered a test set and k−t pixels can be considered a training set. The rendering component 110 can be configured to perform an iterative validation process which estimates prediction errors by splitting pixels into the two disjoint sets (i.e., the test set and the training set). In one embodiment, such a process is a recursive function, which enables the rendering component 110 to efficiently determine the optimal prediction window even when considering k different linear prediction models. For example, given a $(2R+1) \times (2R+1)$ square filtering window $\Omega_c$, the rendering component 110 can estimate the prediction error when $k \in \{1^2, 3^2, 5^2, \ldots, (2R+1)^2\}$. Such k values are chosen by increasing half of the width/height, r, of the prediction window, and thus are computed based on a function of r. As such, k can be parameterized by k(r), thereby formulating the iterative validation approach into the recursion shown in Equation 4.

Iterative Validation Recursion                    Equation 4

$$\hat{\xi}_c(k(r)) = \frac{\hat{\xi}_c^{acc}(k(r))}{(2r+1)^2} = \frac{\hat{\xi}_c^{acc}(k(r-1)) + \Delta \hat{\xi}_c^{acc}(k(r))}{(2r+1)^2}$$

In Equation 3, $\hat{\xi}_c^{acc}(k(r))$ represents the accumulated prediction error, which needs to be normalized with its pixel count, $k(r) \equiv (2r+1)^2$. The error can further be decomposed into two terms: $\hat{\xi}_c^{acc}(k(r-1))$ (i.e., accumulated error from k(0) and to k(r)−1)) and $\Delta \hat{\xi}_c^{acc}(k(r))$ (i.e., the newly added error at the current r-th step). Given this recursion, the newly added error at the r-th step when the prediction size is increased from k(r−1) to k(r) can be estimated using Equation 5.

Estimation of Newly Added Error                    Equation 5

$$\Delta \hat{\xi}_c^{acc}(k(r)) = \sum_{i=1}^{8r} \left( \hat{\beta}_c^T(k(r-1))z_i - y_i \right)^2$$

More specifically, $\hat{\beta}_c(k(r-1))$ represents the estimated linear model from k(r−1) samples and these samples are defined as the training set for the r-th step in order to test newly included $8r \equiv k(r) - k(r-1)$ samples (i.e., the test set of the step). To initiate the recursion, the rendering component 110 can compute two initial values: $\hat{\xi}_c^{acc}(k(0))$ and $\hat{\xi}_c^{acc}(k(1))$. When $k(0)=1^2$, there is only one sample (i.e., the center pixel c) and thus the reconstructed value is $\hat{\beta}_c^T(1)z_c=y_c$. The rendering component 110 can set $\hat{\xi}_c^{acc}(k(0))$ as the variance of the sample mean at the center pixel c (i.e., the error of the Monte Carlo input). Where $k(1)=3^2$, there is only a single training sample and eight test samples, and is such a case the least squares solution can be unstable (e.g., under-determined), since the number of samples is smaller than the local dimensionality d. To alleviate this, the rendering component 110 can apply a one-leave-out cross validation operation, where k−1 pixels are used to test the remaining 1 pixel, and can repeat this test k times in order to test all k pixels. In one embodiment, in this situation, the rendering component 110 is configured to apply Equation 6, shown below.

One-Leave-Out Cross Validation     Equation 6

$$\hat{\xi}_c^{acc}(k(1)) = \sum_{i=1}^{9}\left(\frac{\hat{\beta}_c^T(k(1))z_i - y_i}{1 - z_i^T P_c(k(1))z_i}\right)^2$$

For estimating the prediction error introduced by different values of r, the estimated prediction error $\hat{\xi}_c(k(r))$ (e.g., calculated according to Equation 4) can be plugged into the optimization to calculate the prediction size $k_0$ (e.g., as shown in Equation 2). The rendering component 110 can then select the optimal prediction size $\hat{k}_{opt}$ and its corresponding linear model $\hat{\beta}_c(\hat{k}_{opt})$.

As shown in the method 500, the rendering component 110 can then determine whether all positions within the image being reconstructed are encompassed by at least one linear prediction model (block 540). If the rendering component 110 determines that at least one position within the image is not encompassed by any constructed linear prediction models, the method returns to block 510, where the rendering component 110 selects an additional position(s) within the image being reconstructed and constructs an optimal linear prediction model for the additional position. Once the rendering component 110 determines that all positions within the image are encompassed by at least one linear prediction model, the rendering component 110 renders the image using the constructed linear prediction models (block 550) and the method 500 ends.

In one embodiment, the rendering component 110 is configured to employ an iterative algorithm to determine the positions of the center pixels c for the constructed linear prediction models. For instance, as a first pass, the rendering component 110 could regularly select center pixels c using a granularity factor g, which is initialized to a relatively large value (e.g., width/height of the filtering window) along the X and Y directions in the screen space. As an example, the rendering component 110 could choose a pixel as the center pixel c, whose x and y positions are multipliers of the factor g.

Additionally, the rendering component 110 is configured to calculate color values for the image being reconstructed in an iterative fashion. The rendering component 110 could then estimate an optimal linear model within the optimal prediction size $k_{opt}$ per center pixel, and the rendering component 110 could then predict $k_{opt}$ pixels from each model. The rendering component 110 could then reduce the global granularity factor (e.g., g/2) and could test pixels whose positions are multipliers of the reduced global granularity factor to see whether or not each newly tested pixel is predicted by existing linear models that were constructed in the first pass. If a pixel was not reconstructed during the prior pass (e.g., because of small $k_{opt}$ values due to drastic illumination changes). For example, the rendering component 110 can create a new center pixel c on the pixel and can estimate a new linear prediction model. The rendering component 110 can repeat this process with smaller granularity factors (e.g., g/4 and g/8 for the third and fourth passes, respectively) until all the pixels are predicted from at least a single linear prediction model.

In one embodiment, the rendering component 110 is configured to utilize temporal coherence between frames given a scenario where users can interact with scenes (e.g., navigate a scene). That is, the rendering component 110 can effectively utilize temporal coherence from past frames up to the current frame t. At the current frame t, the rendering component 110 can apply the prediction-based reconstruction techniques for a static image discussed above, in order to utilize spatial coherence between pixels, and can compute the filtered image $\hat{f}(t)$. The rendering component 110 can then use the filtered image as an input y(t) of the temporal filtering. For example, the rendering component 110 could create a linear prediction model per pixel i, and the rendering component 110 could update the coefficients for each linear prediction model at each frame of the animation.

For instance, given the filtered image y(t), the rendering component 110 can update each linear model $\hat{\beta}_i(t)$ at pixel i in frame t by using the extended recursive least squares algorithm shown in Equation 7.

Extended Recursive Least Squares     Equation 7

$$G_i(t) = \frac{P_i(t-1)z_i(t)}{\lambda + z_i(t)^T P_i(t-1)z_i(t)},$$

$$P_i(t) = \lambda^{-1}(P_i(t-1) - G_i(t)z_i(t)^T P_i(t-1)),$$

$$\hat{\beta}_i(t) = \hat{\beta}_i(t-1) + G_i(t)\left(y_i(t) - \hat{\beta}_i^T(t-1)z_i(t)\right)$$

In such an equation, $\lambda$ represents a weight to gradually down-weight previous frames. In one embodiment, $\lambda$ is set to a value near one (e.g., 0.98). In some situations, it may be preferable to track illumination changes based on world positions. For example, a pixel i at frame t can have a totally different illumination compared to one at frame t−1, when an object within the three-dimensional scene being rendered or the camera viewing the scene moves. As such, in a particular embodiment, the rendering component 110 can utilize pixels that share similar world positions and have small prediction errors in order to improve the accuracy of the reconstructed frames. More specifically, given a pixel i at frame t, the rendering component 110 can find a corresponding pixel o at frame t−1 using Equation 8, shown below.

World Position Tracking Algorithm     Equation 8

$$o = \underset{j}{\operatorname{argmax}} \frac{1}{\|W_j(t-1) - W_i(t)\|^2} \frac{1}{\left\|y_i(t) - \hat{\beta}_j^T(t-1)z_i(t)\right\|^2}$$

In such an equation, W represents the 3D object position that primary rays intersect. The rendering component 110 can, for each pixel i at the current frame t, find the closet pixel o, using the Equation 8 shown above. The rendering component 110 can then project the inverse covariance matrix and coefficient vectors, and can update the matrix and vector through the extended recursive least squares. Doing so provides an improved animation sequence, in which hard boundaries may be well-preserved due to the reprojection of both the prediction error and world positions.

Figure 6:
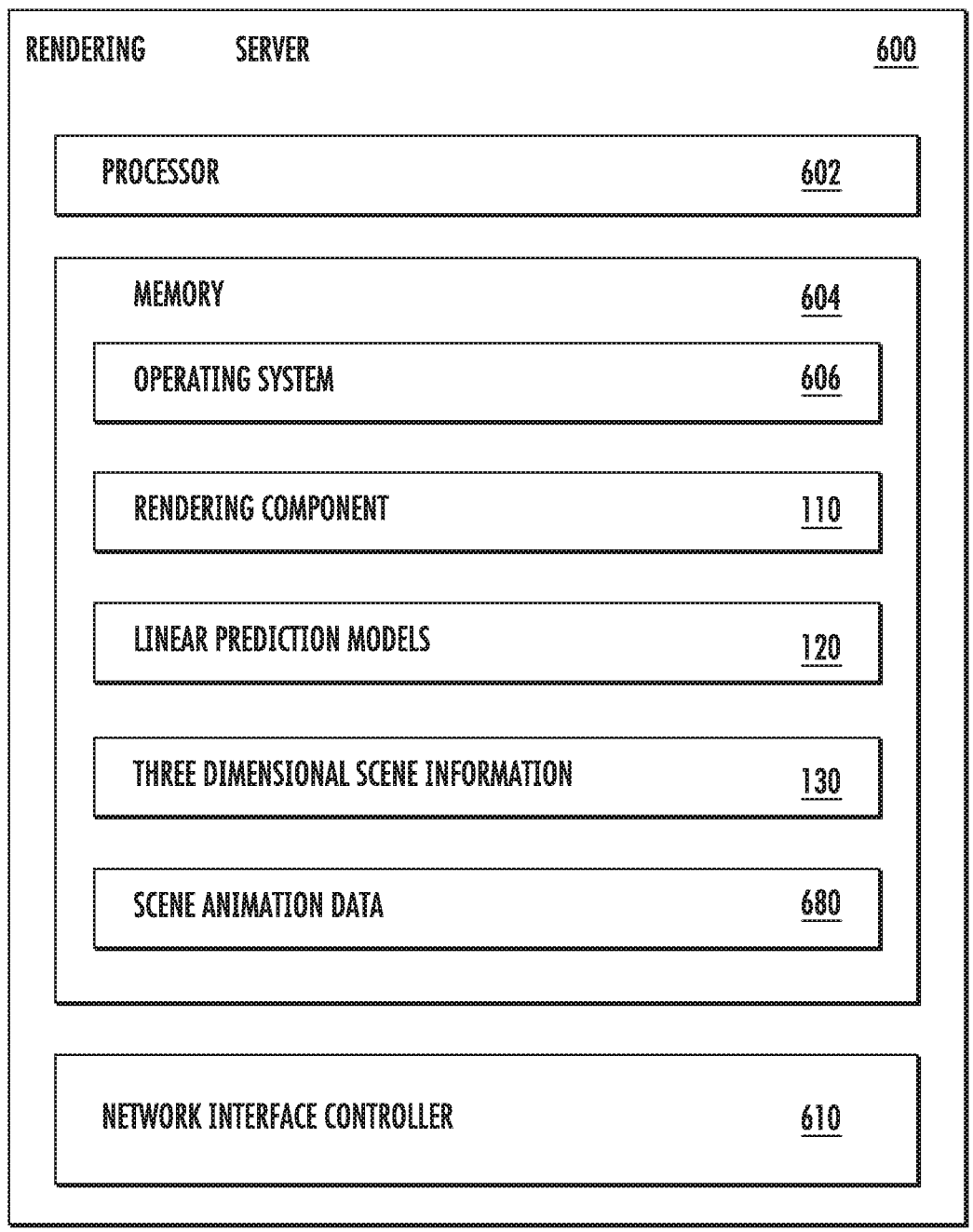
FIG. 6 is a block diagram illustrating a rendering system configured with a rendering component, according to one embodiment described herein.

FIG. 6 illustrates a rendering server configured with a rendering component 120, according to one embodiment described herein. As shown, the rendering server 600 includes, without limitation, a central processing unit (CPU) 602, a memory 604, and a network interface controller 610, each connected to a bus (not shown). The rendering server 600 may also include an I/O device interface (not shown) connecting I/O devices (e.g., keyboard, mouse, and display devices) to the rendering server 600. Further, in context of this disclosure, the computing elements shown in the rendering server 600 may correspond to a physical computing system (e.g., a system in a data center) or may be a virtual computing instance executing within a computing cloud.

The CPU 602 retrieves and executes programming instructions stored in the memory 604 as well as stores and retrieves application data residing in the memory 604. An interconnect (not shown) can be used to transmit programming instructions and application data between CPU 602, I/O devices interface, storage media (not shown), network interface controller 620, and memory 604. Note, CPU 602 is included to be representative of a single CPU, multiple CPUs, a single CPU having multiple processing cores, and the like. Memory 604 is generally included to be representative of a random access memory. Storage such as a disk drive storage device can also be connected to rendering server 600. Such storage may be a combination of fixed and/or removable storage devices, such as fixed disc drives, removable memory cards, or optical storage, network attached storage (NAS), or a storage area-network (SAN).

Illustratively, the memory 604 includes an operating system 606, the rendering component 110, linear prediction models 120, three-dimensional scene information 130 and scene animation data 608. Generally, the rendering component 110 is configured to adaptively reconstruct an image of a view of the three-dimensional scene information 130, using the linear prediction models 120. For instance, the rendering component 110 could select a plurality of positions within the image and could construct a respective linear prediction model 120 for each selected position. In doing so, the rendering component 110 could determine optimal coefficients and an optimal a respective prediction window for each linear prediction model 120. In one embodiment, the rendering component 110 is configured to determine whether all pixels within the image to be reconstructed are encompassed by at least one linear prediction model 120. If a pixel is not encompassed by a constructed linear prediction model 120, the rendering component 110 could create a new linear prediction model 120 centered at the pixel, and the rendering component 110 could determine optimal coefficients and an optimal prediction window for the new linear prediction model. The rendering component 110 could repeat this process until all pixels are encompassed by at least one linear prediction model. The rendering component 110 could then render the image using the constructed linear prediction models to predict values for each of a plurality of pixels of the image.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:

1. A method of rendering an image, comprising:
   selecting a plurality of positions within the image;
   constructing a respective linear prediction model for each selected position, wherein a respective prediction window is determined for each constructed linear prediction model; and
   rendering the image using the constructed linear prediction models to predict values for each of a plurality of pixels of the image, wherein at least one of the constructed linear prediction models is used to predict values for two or more of the plurality of pixels of the image, and wherein a value for at least one of the plurality of pixels is determined based on two or more of the constructed linear prediction models.

2. The method of claim 1, wherein each linear prediction model specifies a respective center pixel within the image.

3. The method of claim 2, wherein each linear prediction model corresponds to a respective prediction window that defines a respective region within the image surrounding the respective center pixel that will be predicted using at least the linear prediction model.

4. The method of claim 1, wherein constructing the respective linear prediction model for each selected position further comprises:
   constructing a respective plurality of linear prediction models for each of the selected positions, wherein each of the plurality of linear prediction models specifies a distinct prediction window;
   determining an estimated prediction error for each of the plurality of linear prediction models; and
   selecting one of the plurality of linear prediction models as the linear prediction model for the respective position.

5. The method of claim 1, wherein constructing the respective linear prediction model for each selected position further comprises:
   estimating prediction error for rendering a portion of the image, as a function of a prediction window of the linear prediction model; and
   determining an optimal prediction window for the linear prediction model, based on the estimated prediction error.

6. The method of claim 5, wherein the prediction error of the linear prediction model is estimated using a recursive function, wherein the prediction error of the linear prediction model is computed for a given prediction window by accumulating the squared differences between newly added pixel values and values previously predicted by a second linear prediction model with a smaller prediction window, relative to the given prediction window.

7. The method of claim 1, wherein the selected plurality of positions comprise a plurality of predefined positions within the image, and further comprising:
   determining at least one pixel within the image that is not encompassed by any of the constructed linear prediction models, based on a respective prediction window for each of the constructed linear prediction models;
   selecting an additional position within the image; and
   constructing an additional linear prediction model corresponding to the additional position within the image, such that the additional linear prediction model is used to predict a value for the at least one pixel when rendering the image.

8. The method of claim 7, wherein the steps of determining the at least one pixel, selecting the additional position and constructing an additional linear prediction model are repeated until all pixels within the image are encompassed by at least one linear prediction model.

9. The method of claim 1, wherein the value for at least one of the plurality of pixels determined based on two or more of the constructed linear prediction models is determined by averaging predicted color values from the two or more constructed linear prediction models.

10. The method of claim 1, wherein the rendered image comprises one of a plurality of frames, and further comprising:
    rendering two or more of the plurality of frames that are subsequent to the rendered image, using the constructed linear prediction models and based on the rendered image.

11. The method of claim 10, wherein rendering the two or more of the plurality of frames that are subsequent to the rendered image further comprises:

determining correspondences between pixels in one of the two or more subsequent frames and pixels in the rendered image; and predicting values for pixels in the two or more subsequent frames, based on coefficients of the linear prediction models used to predict values for the corresponding pixels of the rendered image.

12. The method of claim 1, wherein constructing the respective linear prediction model for each selected position further comprises:

estimating respective intercept and gradient coefficients of a first-order Taylor polynomial, that correspond to a ground truth image and a gradient of the ground truth image, for a given interval of the first-order Taylor polynomial.

13. A non-transitory computer-readable medium containing computer program code that, when executed by operation of one or more computer processors, performs an operation for rendering an image, the operation comprising:

selecting a plurality of positions within the image;

constructing a respective linear prediction model for each selected position, wherein a respective prediction window is determined for each constructed linear prediction model; and rendering the image using the constructed linear prediction models to predict values for each of a plurality of pixels of the image, wherein at least one of the constructed linear prediction models is used to predict values for two or more of the plurality of pixels of the image, and wherein a value for at least one of the plurality of pixels is determined based on two or more of the constructed linear prediction models.

14. The non-transitory computer-readable medium of claim 13, wherein each linear prediction model specifies a respective center pixel within the image.

15. The non-transitory computer-readable medium of claim 14, wherein each linear prediction model corresponds to a respective prediction window that defines a respective region within the image surrounding the respective center pixel that will be predicted using at least the linear prediction model.

16. The non-transitory computer-readable medium of claim 13, wherein constructing the respective linear prediction model for each selected position further comprises:

estimating prediction error for rendering a portion of the image, as a function of a prediction window of the linear prediction model; and determining an optimal prediction window for the linear prediction model, based on the estimated prediction error.

17. The non-transitory computer-readable medium of claim 16, wherein the prediction error of the linear prediction model is estimated using a recursive function, wherein the prediction error of the linear prediction model is computed for a given prediction window by accumulating the squared differences between newly added pixel values and values previously predicted by a second linear prediction model with a smaller prediction window, relative to the given prediction window.

18. The non-transitory computer-readable medium of claim 13, wherein the selected plurality of positions comprise a plurality of predefined positions within the image, and further comprising:

determining at least one pixel within the image that is not encompassed by any of the constructed linear prediction models, based on a respective prediction window for each of the constructed linear prediction models;

selecting an additional position within the image; and constructing an additional linear prediction model corresponding to the additional position within the image, such that the additional linear prediction model is used to predict a value for the at least one pixel when rendering the image.

19. The non-transitory computer-readable medium of claim 18, wherein the steps of determining the at least one pixel, selecting the additional position and constructing an additional linear prediction model are repeated until all pixels within the image are encompassed by at least one linear prediction model.

20. A system, comprising:

one or more computer processors; and a non-transitory memory containing computer program code that, when executed by operation of the one or more computer processors, performs an operation for rendering an image, the operation comprising:

selecting a plurality of positions within the image;

constructing a respective linear prediction model for each selected position, wherein a respective prediction window is determined for each constructed linear prediction model; and rendering the image using the constructed linear prediction models to predict values for each of a plurality of pixels of the image, wherein at least one of the constructed linear prediction models is used to predict values for two or more of the plurality of pixels of the image, and wherein a value for at least one of the plurality of pixels is determined based on two or more of the constructed linear prediction models.

* * * * *

UNITED STATES PATENT AND TRADEMARK OFFICE
CERTIFICATE OF CORRECTION

PATENT NO. : 9,892,549 B2
APPLICATION NO. : 15/183493
DATED : February 13, 2018
INVENTOR(S) : Kenneth Mitchell et al.

It is certified that error appears in the above-identified patent and that said Letters Patent is hereby corrected as shown below:

In the Specification

In Column 9, Line 28, delete "$K_0$" and insert -- $K_{opt}$ --, therefor.

Signed and Sealed this
Twenty-sixth Day of June, 2018

Andrei Iancu
*Director of the United States Patent and Trademark Office*